US00RE38220E

(19) United States
(12) Reissued Patent
Engdahl

(10) Patent Number: US RE38,220 E
(45) Date of Reissued Patent: Aug. 19, 2003

(54) EARTHQUAKE ACTUATED AUTOMATIC GAS SHUTOFF VALVE

(76) Inventor: Paul D. Engdahl, 2930 Grace La. #E, Costa Mesa, CA (US) 92626

(21) Appl. No.: 10/139,909

(22) Filed: May 8, 2002

Related U.S. Patent Documents

Reissue of:
(64) Patent No.: 6,213,142
Issued: Apr. 10, 2001
Appl. No.: 09/307,849
Filed: May 10, 1999

(51) Int. Cl.[7] ..... F16K 17/36
(52) U.S. Cl. ..... 137/38
(58) Field of Search ..... 137/38, 39, 43, 137/533.11, 495

(56) References Cited

U.S. PATENT DOCUMENTS 2,096,785 A * 10/1937 Carter ..... 137/495
2,652,849 A * 9/1953 Ebbs et al. ..... 137/147
2,884,223 A * 4/1959 Cooksley ..... 137/533.11
3,105,516 A * 10/1963 Werra et al. ..... 137/533.11
3,601,152 A * 8/1971 Kenworthy ..... 137/843
4,715,394 A * 12/1987 O'Donnell et al. ..... 137/38
5,823,223 A * 10/1998 Franklin et al. ..... 137/38

* cited by examiner

*Primary Examiner*—Stephen M. Hepperle
(74) *Attorney, Agent, or Firm*—Edgar W. Averill, Jr.

(57) ABSTRACT

An earthquake actuated automatic gas shutoff valve having a valve bottom portion with a generally horizontal floor having a ball seat and a valve seat surrounding a gas outlet passageway. A ball having an elastomeric outer surface is held in the ball seat and in the event of an earthquake, the ball is shaken out of the ball seat and rolls into the valve seat to stop the flow of gas. The ball can either be a solid elastomeric ball or a metal ball with an elastomeric outer coating.

12 Claims, 3 Drawing Sheets

EARTHQUAKE ACTUATED AUTOMATIC GAS SHUTOFF VALVE

Matter enclosed in heavy brackets [ ] appears in the original patent but forms no part of this reissue specification; matter printed in italics indicates the additions made by reissue.

BACKGROUND OF THE INVENTION

The field of the invention is earthquake actuated gas shutoff valves. There is a large variety of designs of such valves. One such valve is shown in U.S. Pat. No. 5,823,223 which has a ball held on a pedestal. This patent is a continuation in part of U.S. Pat. No. 5,603,345. During an earthquake the ball of the '223 patent falls off of the pedestal and falls over a valve seat. The valve is reset externally by turning an arm which moves the ball off of the valve seat and back onto the pedestal. Another design is shown in U.S. Pat. No. 5,704,385 where a ferromagnetic ball rolls out of a depression and causes a valve member to move against a valve seat thereby blocking the flow of gas. In a different embodiment, the ball is held in a depression and rolls into a valve seat in the gas flow path. The ball is manipulated magnetically to reset the valve.

Another version of a ball which rolls out of a higher position to a lower position where it blocks a valve seat is shown in U.S. Pat. No. 5,603,345. Yet another version of a ball held in a depression which moves into a valve seat is shown in U.S. Pat. No. 5,052,429. Another version is shown in U.S. Pat. No. 4,889,150. Still another valve using a ball resting on a pedestal is shown in U.S. Pat. No. 4,715,394. A relatively simple design is shown in U.S. Pat. No. 3,747,616 where the ball is reset by a string attached to the ball.

One inherent disadvantage of using a steel ball is the damage the steel ball can do during shipping. Various approaches have been used to reduce this problem, some of which involve the addition of packing materials during shipping. Occasionally, during installation, the installer will forget to remove the packing materials. Also, many of the prior art valves do not have any means of determining when the valve is open or closed from the exterior of the valve.

BRIEF SUMMARY OF THE INVENTION

It is an object of the present invention to provide an earthquake actuated automatic gas shutoff valve which can be shipped without the necessity of capturing the ball during shipping and which is equipped with means for determining whether the valve is open or closed from the exterior of the valve.

The present invention is for an earthquake actuated automatic gas shutoff valve which has a valve cover, a valve body and a valve bottom. The valve bottom has a generally horizontal floor with a ball seat formed in the floor. A valve seat surrounds a gas outlet passageway in the floor. An elastomeric ball is placed in the ball seat and during an earthquake the ball moves out of the ball seat and falls into the valve seat, and a moving arm is operated from outside the valve to move the ball from the valve seat back to the ball seat. Preferably, the valve includes a sight glass which shows whether or not the ball is in the valve seat or on the ball seat. The ball can be either a solid or hollow elastomeric ball or can have an elastomeric outer layer and a metal inner layer. The valve can also be equipped with a manual shutoff feature. In this way the user can easily turn off the flow of gas without the necessity of manipulating the large and often difficult to close shutoff valve in the main gas line.

DESCRIPTION OF THE PREFERRED EMBODIMENTS

Figure 1:
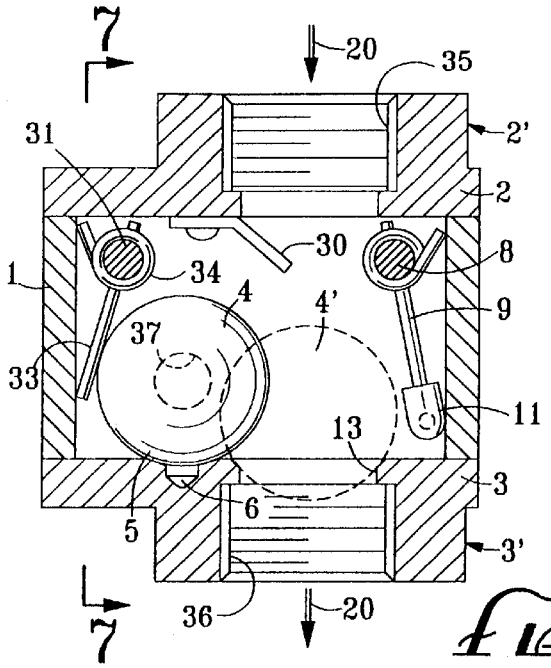
FIG. 1 is a cross-sectional view of the earthquake actuated automatic gas shutoff valve of the present invention.
Figure 3:
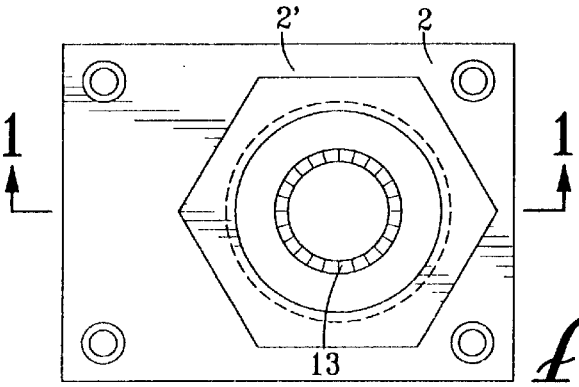
FIG. 3 is a top view of the valve with the cover in place.
Figure 6:
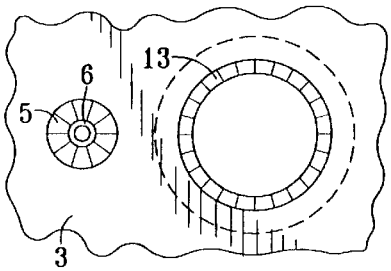
FIG. 6 is an enlarged top view of the floor of the bottom of the valve of FIG. 1.

An earthquake actuated automatic gas shutoff valve is shown in FIG. 1 and has a valve body 1, a cover 2 and a bottom 3. Cover 2 has a hexagonal portion 2' shown best in FIG. 3 of the drawings. Bottom 3 also has a hexagonal portion 3' identical to hexagonal portion 2'.

An elastomeric ball 4 is shown on a ball seat 5 in FIG. 1 in which position gas may flow through the valve in the direction of arrows 20. After an earthquake, the ball moves to a position shown in phantom view indicated by reference character 4' in FIG. 1, where it rests in valve seat 13, thereby shutting off the flow of gas through the valve. As will be discussed below, ball seat 5 has a drilled hole 6 below it.

Figure 2:
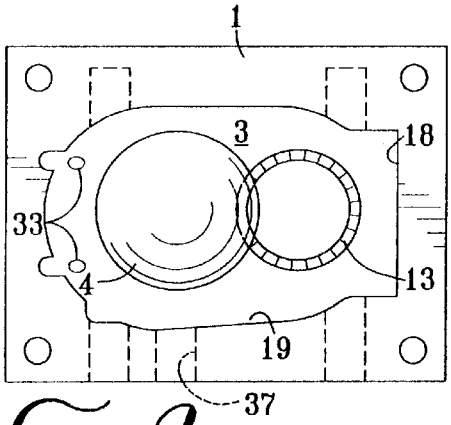
FIG. 2 is a top view of the valve with the cover removed.

As shown in FIG. 2, valve body 1 has a wall 18 which restricts the travel of the ball. An angled surface 19 of the wall 18 is shaped to assist in the deflection of the ball toward the valve seat 13. The ball 4 is moved from the closed position indicated by reference character 4' in FIG. 1 to an open position indicated by reference character 4 in FIG. 1 by the turning of reset shaft 8 shown in FIG. 4. As shown best in FIG. 5, reset shaft 8 holds a pair of downwardly depending arms 9 which support a ball contact arm 10 which is rotatingly held in arm support members 11. Reset shaft 8 is manipulated by a coin or screwdriver inserted in slot 12 shown best in FIG. 4 of the drawings. Reset shaft 8 is urged in a counter clockwise direction by spring 16 shown in FIG. 5 so that the ball contact arm will be retained in the position shown in FIG. 1 out of the way of the valve seat 13.

Figure 7:
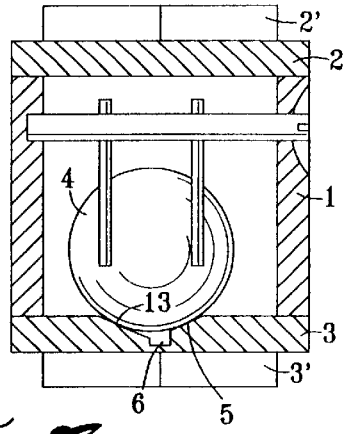
FIG. 7 is a cross-sectional view taken along line 7—7 of FIG. 1.

A beneficial feature of the present design is the provision of means to manually close the valve even when there is no earthquake. This is accomplished by rotating shaft 31, also supported by body 1 in FIG. 4. Shaft 31 also extends out of body 1 and has a screwdriver or coin slot 32. A pair of rods 33 shown best in FIG. 7 contact ball 4 and move it from its ball seat 5 into the position shown by reference character 4' in FIG. 1 against valve seat 13. Occasionally, the manual shutoff valve in the gas line (not shown) is corroded or difficult to turn and this provides an easy method of turning off the flow of gas without having to get a wrench to close the conventional gas shutoff valve. Shaft 31 can be readily turned with a coin, thereby permitting the shutting off of the valve in an emergency without the necessity of finding a wrench. A spring 34 shown in FIG. 1 retains rods 33 out of the way until the shaft 31 is turned. Reset shaft 8 and closing shaft 31 are, of course, provided with O-rings and roll pins to limit turning and axial motion, such features being conventional, they are not shown in the drawings, since they are not necessary for an understanding of the present invention.

Figure 12:
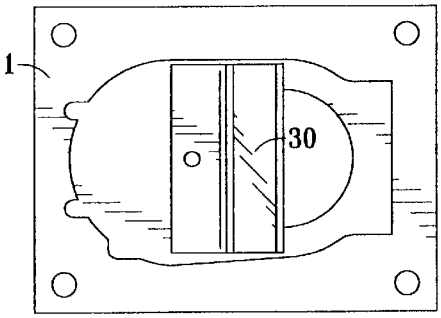
FIG. 12 is a bottom view of the top of the valve of FIG. 1.

Another feature of the valve as shown in FIG. 1 is the provision of a gas deflector 30 shown in top view in FIG. 12. An inlet gas line (not shown) is threaded into the threaded opening 35 in cover 2. This is the gas inlet path and gas flowing at a relatively high rate of flow from inlet 35 out of outlet 36 could theoretically be sufficient to pull a relative light elastomeric ball 4 from its ball seat and into the closed position in valve seat 13. Gas deflector 30 directs the flow of gas away from ball 4 and causes sufficient turbulence so that the gas flow path does not tend to pull ball 4 out of ball seat 5.

Figure 9:
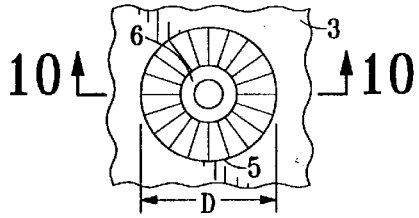
FIG. 9 is an enlarged plan view of the ball seat of the valve of FIG. 1.
Figure 10:
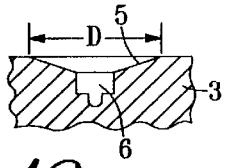
FIG. 10 is a cross-sectional view of the ball seat taken along line 10—10 of FIG. 9.

The preferred construction of ball seat is shown best in FIGS. 9 and 10 where the ball seat 5 can be seen to be a conical depression in bottom 3. The depression has a diameter D. The diameter D of the ball seat determines the actuation G level at higher frequencies. The standard calls for the closing of the valve at a G level of over 0.4 G at 10 Hz compared to 0.15 G at 2.5 Hz. For the same G level the movement at 10 Hz is only 1/16 that at 2.5 Hz. The diameter of the seat can be made large enough to contain the 10 Hz movement while allowing the lower frequencies to actuate. To meet the standard the diameter is preferably about 0.375". The angle of the cone is preferably about 13°. Of course, the ball seat can be machined out and an insert added with a different angle and diameter for different actuation requirements. The hole 6 at the apex of ball seat 5 is useful for lightweight balls to provide repeatable actuation at higher frequencies. At 7.5 Hz and 10 Hz the ball is shaking back and forth and cannot escape the ball seat just below the actuation level. While a steel ball will keep reasonable contact with the seat, a lightweight elastomer beings to float on an air cushion causing the actuation level to vary. By adding hole 6 at the apex of the cone, as large as possible without interfering with the ball seat of the ball, the cushion of air is reduced dramatically and the ball stays in contact with the cone for constant actuation.

Figure 8:
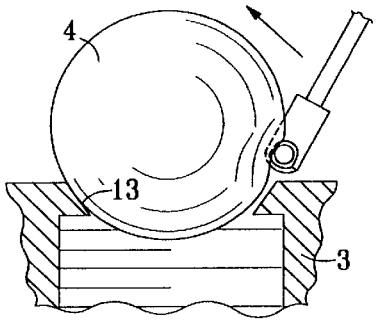
FIG. 8 is an enlarged side view of a first embodiment of a ball unseating apparatus of the valve of FIG. 1.
Figure 14:
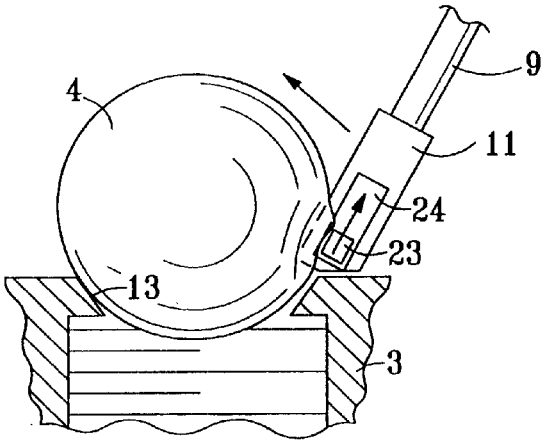
FIG. 14 is a side view of an alternate embodiment of a ball removal assembly of the valve of FIG. 1.

Another interesting advantage of the use of an elastomeric ball 4 is its ability to form a gas tight seal in seat 13 without the necessity of using an O-ring. The elastomeric ball under higher pressures tends to form a very tight seal and this could make it difficult to remove the ball from the seat if a conventional bar was used. For this reason, it has been found useful to provide a rotating ball contact arm 10. As indicated in FIG. 8, as the elastomeric ball 4 starts to be moved out of valve seat 13, it will move upwardly against the rotating ball contact arm 10, since it will not tend to slide at its point of contact indicated by reference character 13 in FIG. 8. Two actions assist in rolling the ball out of valve seat 13. One is shown in FIG. 8 where the elastomeric ball is depressed and provides a small opening 36 which will permit the gas pressure to quickly become equalized on both sides of ball 4, facilitating the removal of ball 4 from valve seat 13. Several other structures will permit this same upward movement at the point of contact of ball 4 with arm 10. In FIG. 14 a square bar 23 is held in a bar slot 24 in arm support member 11. This permits the square bar 23 to move upwardly as the ball is urged out of valve seat 13 as shown in FIG. 14. The term "elastomeric" as used herein is intended to mean a polymer which possesses rubber-like qualities, especially the ability to regain shape after deformation.

Figure 15:
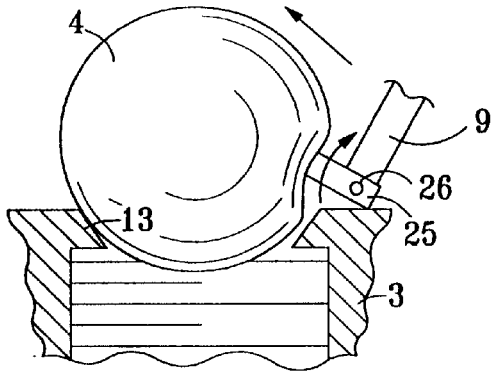
FIG. 15 is a side view of an alternate embodiment of the ball removal assembly of the valve of FIG. 1.

In FIG. 15, a hinged bar 25 is hingedly pinned at pin 26 to downwardly depending arm 9 so that it may rotate upwardly as indicated by the arrow in FIG. 15. Any of these means will help to roll the ball out of the valve seat and greatly facilitates the removal of the ball as compared to an arm fixed to arms 9.

Figure 4:
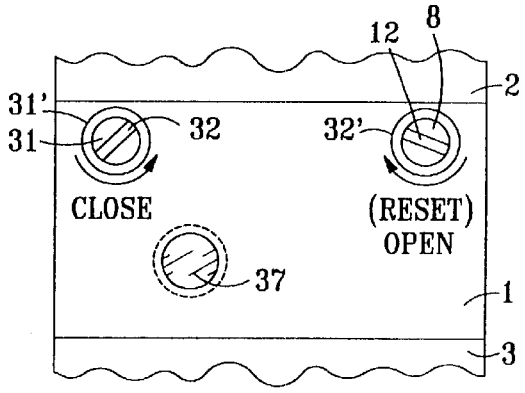
FIG. 4 is a front view of the valve of FIG. 1.
Figure 5:
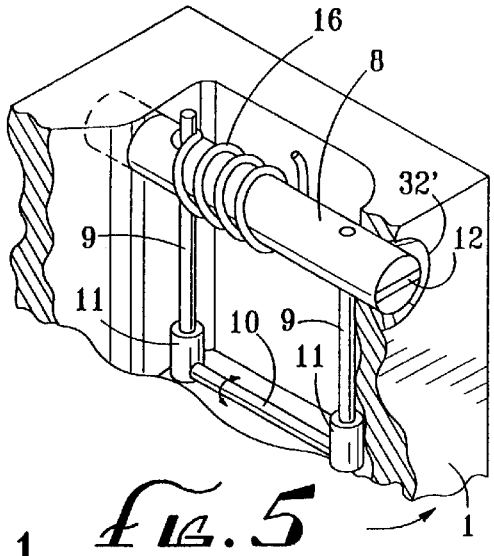
FIG. 5 is an enlarged perspective view showing the ball removal apparatus of the valve of FIG. 1.

Another interesting feature of the valve of the present invention is the provision of sight glass 37 shown best in FIG. 4 of the drawings. This permits a user to see the position of the ball through sight glass 37. It may be positioned either as shown in FIG. 1 adjacent the ball positioned in ball seat 5. Alternatively, it could be positioned adjacent the position of ball 4' in FIG. 1, which would show the ball fixed in the closed position. This permits one to quickly see the ball position. Another feature which is able to make the operation of the valve of the present invention more intuitive is to utilize a colored elastomeric ball in conjunction with sight glass 37. For instance, when the sight glass is positioned as shown in FIG. 1 of the drawings adjacent the ball seat 5, and the ball is made green, the user is naturally led to believe that the gas flow path is on. Conversely, if the ball were made from a red polymer and the sight glass was positioned over the ball seat, one looking through the sight glass and seeing a red ball would tend to believe that the valve is off and the gas flow is stopped.

Another beneficial feature can be added by counter sinking shafts 31 and 8. A conical depression 31' and a conical depression or recess 8' permits these shafts 31 and 8 not to extend outwardly from the valve body so that they are less likely to be damaged during shipment and construction. It is not uncommon for a workman to drop a hammer or brick and if the shafts extend a significant distance away from the body, the likelihood of damage to the valve is increased. By recessing these shafts, a valve results which is more resistent to rough handling.

The shape of the wall 18 is designed to provide several actions. First, the wall and the rods 33 are positioned so that the center of gravity of the ball is always over ball seat 5 once the ball has been pushed back away from valve seat 13. In this way, after resetting, the ball will always fall back into ball seat 5. A portion of wall 18 is angled as indicated by reference character 19, which helps in the event of cross-axis shaking (up and down as viewed in FIG. 2). The ball will not simply bounce back and forth over the ball seat 5 but instead, will ricochet off angled portion 19 toward valve seat 13.

Construction of the valve is simplified by providing that the body, cover and bottom are in three separate pieces as shown in FIG. 1. This three-piece configuration is not essential, however, but it does permit the extrusion of the valve body. In order to secure the body pieces into one strong unit, four special screws 27 (see FIG. 13) are used which act as dowel pins and permit the turning of the valve as a solid block.

Figure 11:
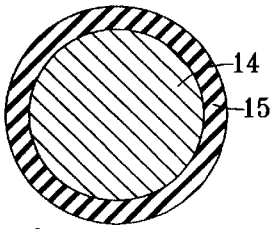
FIG. 11 is a cross-sectional view of a ball having a metal core and an elastomeric outer cover.
Figure 13:
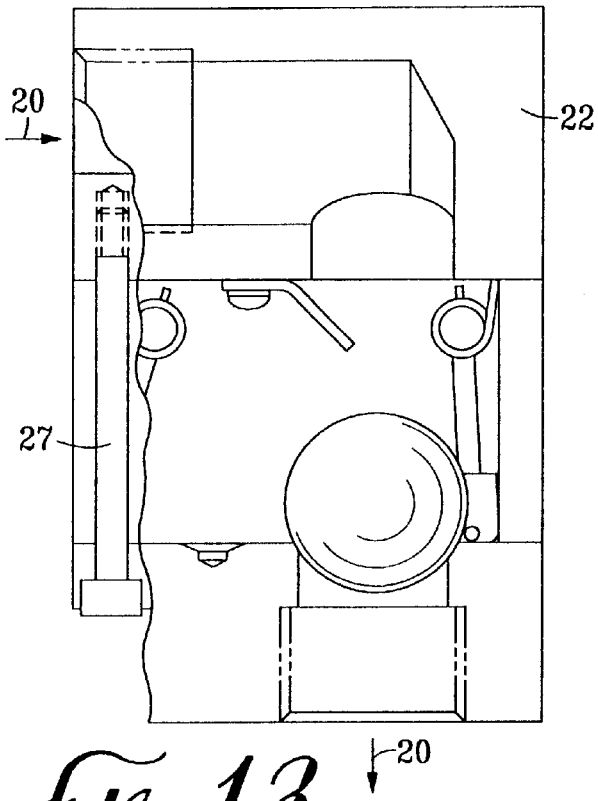
FIG. 13 is side view of an alternate configuration of a gas inlet portion of the valve of FIG. 1.
Figure 16:
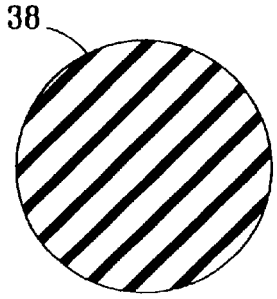
FIG. 16 is a cross-sectional view of an elastomeric ball.
Figure 17:
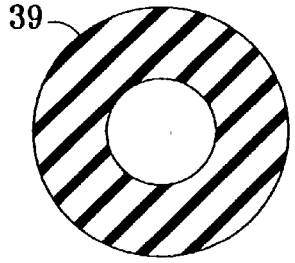
FIG. 17 is a cross-sectional view of a hollow elastomeric ball.

A valve cover 2 is shown in FIG. 13 having an L-shaped configuration. It is, of course, also possible that such configuration could be formed in bottom 3. The construction of the ball is preferably a solid elastomer as indicated by ball 38 in FIG. 16. Alternatively, it can be an elastomeric ball with a hollow center, such as shown in FIG. 17 and indicated by reference character 39. The ball shown in FIG. 11 has a metal core 14 and an outer elastomer 15 which, of course, provides a heavier ball and permits the use of magnetic manipulation if desired. Furthermore, if the valve were subjected to a temperature high enough to disintegrate the elastomer, the steel portion is still large enough to shut off the gas flow.

Elastomeric balls can change hardness with temperature and it has been found that by the use of a fluorosilicone elastomer, a very wide range of temperatures is permitted without any degradation of the elastomeric properties of the ball. It is, of course, possible to use a solid hard plastic ball or a metal ball in the valve of the present invention, but the sealing features and the damage-free features would be adversely affected.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An earthquake actuated automatic gas shutoff valve comprising:

a valve cover portion having means for connection to a gas inlet line and a gas inlet passageway;

a valve body portion affixed to said valve cover, said valve body portion having an inner shaped wall;

a valve bottom portion affixed to said valve body portion, said valve bottom portion having a generally horizontal floor having a ball seat and a valve seat surrounding a gas outlet passageway and said gas outlet passageway having means for connection to a gas outlet line;

a ball having an elastomeric outer surface, said ball being larger than said valve seat so that when the ball is moved over said valve seat, the ball will shut off the flow of gas through said valve; and means external of said valve for moving said ball from a position where it shuts off the flow of gas to a position where it rests in said ball seat and does not interfere with the flow gas through the valve wherein said means external of said valve for moving said ball from a position where it shuts off the flow of gas to a position where it rests in said ball seat comprises:

an actuating arm supported by said valve body portion near the valve cover and above a side of the valve body portion closest to said valve seat;

at least one downwardly depending arm held by said actuating arm and extending downwardly to a position adjacent said generally horizontal floor adjacent the side of the valve body portion closest to said valve seat and said at least one downwardly depending arm being biased toward said side of the valve body portion closest to said valve seat;

a ball contact arm held near said lower end of said at least one downwardly depending arm, said ball contact arm including means for moving a ball contact point on said ball contact arm upwardly as it moves the ball out of contact with the valve seat comprising a pair of downwardly depending arms and vertical slots at the lower end of each downwardly depending arm and said ball contact arm being held in said slots so that it can move upwardly as the ball contact arm rolls the ball out of contact with said valve seat; and means external of said valve body portion for turning said actuating arm whereby when said ball is over said valve seat, and said actuating arm is turned, said ball contact arm will touch and roll said ball out of contact with the valve seat and into said ball seat.

2. The earthquake actuated automatic gas shutoff valve of claim 1 wherein said ball having an elastomeric outer surface is a solid elastomeric ball.

3. The earthquake actuated automatic gas shut off valve of claim 2 wherein said ball is fabricated from fluorosilicone.

4. The earthquake actuated automatic gas shutoff valve of claim 1 wherein said ball is an elastomeric ball with a metal core.

5. The earthquake actuated automatic gas shutoff valve of claim 1 wherein said ball seat is a shallow conical opening having a central recess formed in a vertical center thereof.

6. An earthquake and manually actuated automatic gas shutoff valve comprising:

a valve cover portion having means for connection to a gas inlet line and a gas inlet passageway;

a valve body portion affixed to said valve cover portion, said valve body portion having an inner shaped wall;

a valve bottom portion affixed to said valve body portion, said valve bottom portion having a ball seat and a valve seat surrounding a gas outlet passageway and said gas outlet passageway having means for connection to a gas outlet line;

a ball larger than said valve seat so that when the ball is moved over said valve seat, the ball will shut off the flow of gas through said valve;

means external of said valve for manually moving said ball from a position where it shuts off the flow of gas to a position where it rests in said ball seat and does not interfere with the flow of gas through the valve; and means external of said valve for manually moving said ball from a position where [is] *it* rests in said ball seat to a position where it rests over said valve seat.

7. The earthquake and manually actuate gas shutoff valve of claim 6 further including a sight glass in said valve body portion adjacent a position of said ball when it rests in at least one of said ball seat and said valve seat whereby the position of the ball may be determined externally of said valve body portion.

8. An earthquake actuated automatic gas shutoff valve comprising:

a valve cover portion having means for connection to a gas inlet line and a gas inlet passageway;

a valve body portion affixed to said valve cover, said valve body portion having an inner shaped wall;

a valve bottom portion affixed to said valve body portion, said valve bottom portion having a generally horizontal floor having a ball seat and a valve seat surrounding a gas outlet passageway and said gas outlet passageway having means for connection to a gas outlet line;

a ball having an elastomeric outer surface, said ball being larger than said valve seat so that when the ball is moved over said valve seat, the ball will shut off the flow of gas through said valve; and means external of said valve for moving said ball from a position where it shuts off the flow of gas to a position where it rests in said ball seat and does not interfere with the flow of gas through the valve comprising an actuating arm supported by said valve body portion near the valve cover and above a side of the valve body portion closest to said valve seat; at least one downwardly depending arm held by said actuating arm and extending downwardly to a position adjacent said generally horizontal floor adjacent side of the valve body portion closest to said valve seat and said at least one downwardly depending arm being biased toward said side of the valve body portion closest to said valve seat; a ball contact arm held near said lower end of said at least one downwardly depending arm, said ball arm contact arm including means for moving a ball contact point on said ball contact arm upwardly as it moves the ball out of contact with the valve seat; and means external of said body portion for turning said actuating arm whereby when said ball is over said valve seat and said actuating arm is turned, said ball contact arm will touch and roll said ball out of contact with the valve seat and into said ball seat and further including means external of said valve from manually moving said ball from a position where it rests in said ball seat to a position where it rests on said valve seat to permit the manual turning off of the gas shutoff valve.

9. An earthquake actuated automatic gas shutoff valve comprising:

a valve cover portion having means for connection to a gas inlet line and a gas inlet passageway;

a valve body portion affixed to said valve cover, said valve body portion having an inner shaped wall;

a valve bottom portion affixed to said valve body portion, said valve bottom portion having a generally horizontal floor having a ball seat and a valve seat surrounding [a] a gas outlet passageway and said gas outlet passageway having means for connection to a gas outlet line;

a ball having an elastomeric outer surface, said ball being larger than said valve seat so that when the ball is moved over said valve seat, the ball will shut off the flow of gas through said valve; and means external of said valve for moving said ball from a position where it shuts off the flow of gas to a position where it rests in said ball seat [comprises] *comprising*:

[the earthquake actuated automatic gas shutoff valve of claim 1 wherein said means external of said valve for moving said ball from a position where it shuts off the flow of gas to a position where it rests in said ball seat comprises:]

[is] an actuating arm supported by said valve body portion near the valve cover and above a side of the valve body portion closest to said valve seat;

at least one downwardly depending arm held by said actuating arm and extending downwardly to a position adjacent said generally horizontal floor adjacent the side of the valve body portion closest to said valve seat and said at least one downwardly depending arm being biased toward said side of the valve body portion closest to said valve seat;

a ball contact arm head near said lower end of said at least one downwardly depending arm, said ball contact arm including means for moving a ball contact point on said ball contact arm upwardly as it moves the ball out of contact with the valve seat comprising a pair of downwardly depending arms and vertical slots at the lower end of each downwardly depending arm and said ball contact arm being held in said slots so that it can move upwardly as the ball contact arm rolls the ball out of contact with said valve seat; and means external of said valve body portion for turning said actuating arm whereby when said ball is over said valve seat, and *when* said actuating arm is turned, said ball contact arm will touch and roll said ball out of contact with the valve seat and into said ball seat and further including a deflection plate positioned in a gas flow pack between said gas inlet passageway and said gas outlet passageway and adjacent said gas inlet passageway to deflect the flow of gas away from said ball.

10. The earthquake actuated automatic gas shutoff valve of claim 8 further including a sight glass positioned in said valve body portion above at least one of said ball seat and said valve seat so that the position of the ball in the valve body may be determined by looking through the sight glass.

*11. An earthquake and manually actuated automatic gas shutoff valve comprising:*

*a valve body having an upper area, an inlet area having means for connection to a gas inlet line and a gas inlet passageway forming an entry into an interior of said valve body, an inner shaped wall and a bottom area having a generally horizontal floor having a ball seat and a valve seat surrounding a gas outlet passageway and said gas outlet passageway having means for connection to a gas outlet line;*

*a ball larger than said valve seat so that when the ball is moved over said valve seat, the ball will shut off the flow of gas through said valve;*

*means external of said valve for manually moving said ball from a position where it shuts off the flow of gas to a position where it rests in said ball seat and does not interfere with the flow of gas through the valve; and*

*means external of said valve for manually moving said ball from a position where is rests in said ball seat to a position where it rests over said valve seat.*

*12. The earthquake and manually actuated automatic gas shutoff valve of claim 11 wherein said means external of said valve for manually moving said ball from a position where it shuts off the flow of gas to a position where it rests in said ball seat comprises:*

*a valve opening actuating arm supported by said valve body near the upper area of said valve body;*

*at least one downwardly depending arm held by said valve opening actuating arm and extending downwardly to a lower end adjacent said generally horizontal floor adjacent the valve seat and said at least one downwardly depending arm being biased toward a portion of the inner shaped wall closest to said valve seat;*

*a ball contact arm held near said lower end of said at least one downwardly depending arm, said ball contact arm including means for moving a ball contact point on said ball contact arm over a portion of said valve seat as it moves the ball out of contact with the valve seat; and*

*means for turning said valve opening actuating arm whereby when said ball is over said valve seat, and said valve opening actuating arm is turned, said ball contact arm will touch and roll said ball out of contact with the valve seat and into said ball seat; and*

*wherein said means external of said valve for manually moving said ball from a position where is rests in said ball seat to a position where it rests over said valve seat comprises:*

*a valve closing actuating arm supported by said valve body near the upper area of said valve body;*

*at least one downwardly extending arm held by said valve closing actuating arm and extending downwardly to a lower end adjacent said generally horizontal floor adjacent the ball seat and said at least one downwardly extending arm being biased toward a portion of the inner shaped wall closest to said ball seat;*

*a ball contact arm held near said lower end of said at least one downwardly extending arm, said ball contact arm including means for moving a ball contact point on said ball contact arm over a portion of said ball seat as it moves the ball out of contact with the ball seat and into position to cover said valve seat; and*

*means external of said valve body portion for turning said valve closing actuating arm whereby when said ball is over said ball seat, and said actuating arm is turned, said ball contact arm will touch and roll said ball out of contact with the ball seat and into said valve seat to shut off the flow of gas.*

* * * * *